US011126421B2

(12) United States Patent
Lee et al.

(10) Patent No.: US 11,126,421 B2
(45) Date of Patent: Sep. 21, 2021

(54) APPARATUS FOR PROVIDING UPDATE FOR VEHICLE AND COMPUTER-READABLE STORAGE MEDIUM

(71) Applicants: HYUNDAI MOTOR COMPANY, Seoul (KR); KIA MOTORS CORPORATION, Seoul (KR)

(72) Inventors: Hee Jun Lee, Seoul (KR); Jae Am Seo, Seongnam-si (KR); Heok Sang Jeong, Suncheon-si (KR); Myeong Gyu Jeong, Seoul (KR); Dong Youl Lee, Seoul (KR); Soo Yun Kim, Incheon (KR); Won Ho Shin, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 145 days.

(21) Appl. No.: 16/541,468

(22) Filed: Aug. 15, 2019

(65) Prior Publication Data

US 2020/0159517 A1    May 21, 2020

(30) Foreign Application Priority Data

Nov. 16, 2018    (KR) .................... 10-2018-0142016

(51) Int. Cl.
*G06F 9/44*    (2018.01)
*G06F 8/65*    (2018.01)
(Continued)

(52) U.S. Cl.
CPC ............ *G06F 8/65* (2013.01); *B60R 16/0231* (2013.01); *G06F 9/44578* (2013.01)

(58) Field of Classification Search
CPC ........ G06F 9/44578; G06F 8/447; G06F 8/65; G06F 8/70; B60R 16/0231
(Continued)

(56) References Cited

U.S. PATENT DOCUMENTS 9,417,769 B2 *   8/2016  Shirota ................ G09G 3/3453
10,514,900 B2 * 12/2019  Teraoka ................. G06F 11/00
(Continued)

OTHER PUBLICATIONS

Priority-based coordination of autonomous and legacy vehicles at intersection author: X. Qian et al published on 2014.*
(Continued)

*Primary Examiner* — Chameli Das
(74) *Attorney, Agent, or Firm* — Morgan, Lewis & Bockius LLP

(57) ABSTRACT

An apparatus providing an update for a vehicle includes a plurality of controllers, a communication circuit communicating with a server, a memory configured to store data received from the server, and a control circuit electrically connected to the plurality of controllers, the communication circuit, and the memory. The control circuit is configured to set an order of the update, based on a preset priority and a size of update data, which correspond to each of the plurality of target controllers, when an update for a plurality of target controllers among the plurality of controllers is required, to receive the update data corresponding to each of the plurality of target controllers, from the server using the communication circuit in the set order, and to update the plurality of target controllers in the set order using the received update data.

12 Claims, 6 Drawing Sheets

(51) Int. Cl.
  *B60R 16/023* (2006.01)
  *G06F 9/445* (2018.01)
(58) Field of Classification Search
  USPC .......................................................... 717/168
  See application file for complete search history.

(56) References Cited

U.S. PATENT DOCUMENTS

| | | | | |
|---|---|---|---|---|
| 2004/0174385 | A1* | 9/2004 | Ikeda | G09G 5/393 |
| | | | | 345/629 |
| 2007/0027870 | A1* | 2/2007 | Kim | G06F 9/52 |
| 2014/0109075 | A1* | 4/2014 | Hoffman | G06F 11/1464 |
| | | | | 717/169 |
| 2014/0344798 | A1* | 11/2014 | Sasaki | G05B 19/41845 |
| | | | | 717/170 |
| 2015/0358955 | A1* | 12/2015 | Kresse | G06Q 30/0255 |
| | | | | 370/329 |
| 2016/0077827 | A1* | 3/2016 | Throop | B60L 3/12 |
| | | | | 717/168 |
| 2016/0371077 | A1* | 12/2016 | Moeller | G06F 8/654 |
| 2019/0138292 | A1* | 5/2019 | Quin | H04L 67/34 |
| 2019/0235855 | A1* | 8/2019 | Nakano | G06F 13/4204 |
| 2019/0354364 | A1* | 11/2019 | Seki | G06F 8/65 |
| 2020/0322830 | A1* | 10/2020 | Nagamura | H04W 28/0226 |

OTHER PUBLICATIONS

Vehicle software updates distribution with SDN and cloud computing author: M Azizian et al published on 2017.*

Title: ECU software updating in future vehicle networks, author: Y Onuma, et al, published on 2017, source: IEEE.*

Title: Incremental update method for resource-constrained in-vehicle ECUs, author: H Teroaka et al, published on 2016, source: IEEE.*

* cited by examiner

APPARATUS FOR PROVIDING UPDATE FOR VEHICLE AND COMPUTER-READABLE STORAGE MEDIUM

CROSS-REFERENCE TO RELATED APPLICATION

This application claims the benefit of priority to Korean Patent Application No. 10-2018-0142016, filed on Nov. 16, 2018 in the Korean Intellectual Property Office, the entire contents of which are incorporated herein by reference.

TECHNICAL FIELD

The present disclosure relates to a technology for updating the software of a controller mounted in a vehicle.

BACKGROUND

With the development of the automobile industry, a system for providing various services using wireless communication technology is continuously being developed to provide convenience to a driver. For example, a vehicle may update the software of a controller mounted in a vehicle, over wireless communication. Because the controller is not updated during driving, the controller may be updated while the vehicle is stopped. Because the period in which the vehicle is stopped is changeable and limited, there is a need to improve the efficiency of the update.

SUMMARY

When a plurality of controllers are updated in a random order upon requiring an update for the plurality of controllers, it may be a problem that more urgent updates can be postponed. Moreover, an error may occur when only a part of controllers that need cooperative control among the plurality of controllers is updated. When the plurality of controllers are updated in arbitrary order, the efficiency of the update may be lowered.

The present disclosure has been made to solve the above-mentioned problems occurring in the prior art while advantages achieved by the prior art are maintained intact.

According to an aspect of the present disclosure, an apparatus and a method for efficiently setting the execution order of update in consideration of various situations.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus of providing an update for a vehicle may include a plurality of controllers, a communication circuit communicating with a server, a memory configured to store data received from the server, and a control circuit electrically connected to the plurality of controllers, the communication circuit, and the memory. The control circuit may be configured to set an order of the update, based on a preset priority and a size of update data, which correspond to each of the plurality of target controllers, when an update for a plurality of target controllers among the plurality of controllers is required, to receive the update data corresponding to each of the plurality of target controllers, from the server using the communication circuit in the set order, and to update the plurality of target controllers in the set order using the received update data.

According to an exemplary embodiment, the control circuit may be configured to check version information of update data for each of the plurality of controllers, which is stored in the server and to determine the plurality of target controllers, which require the update, among the plurality of controllers based on the version information of the update data.

According to an exemplary embodiment, the control circuit may be configured to set the order of the update based on the preset priority and to set the order of the update to the two or more target controllers having the same priority, based on the size of the update data when the preset priority of each of two or more target controllers among the plurality of target controllers is the same.

According to an exemplary embodiment, the control circuit may be configured to first update a target controller, which has a smaller size of the update data, among the two or more target controllers.

According to an exemplary embodiment, the control circuit may be configured to set the order of the update of the two or more target controllers, based on the size of the update data for all of the two or more target controllers when two or more target controllers among the plurality of target controllers are related to each other.

According to an exemplary embodiment, the control circuit may be configured to identify two or more target controllers, which perform cooperative control with each other, among the plurality of target controllers as the two or more target controllers that are related to each other.

According to an exemplary embodiment, the control circuit may be configured to simultaneously receive the update data for all of the two or more target controllers, from the server using the communication circuit.

According to another aspect of the present disclosure, an update providing method of a vehicle may include setting an order of the update, based on a preset priority and a size of update data, which correspond to each of the plurality of target controllers when an update of a plurality of target controllers among a plurality of controllers included in the vehicle is required, receiving the update data corresponding to each of the plurality of target controllers, from a server in the set order, and updating the plurality of target controllers in the set order using the received update data.

According to an exemplary embodiment, the method may further include checking version information of update data for each of the plurality of controllers, which is stored in the server and determining the plurality of target controllers, which require the update, among the plurality of controllers based on the version information of the update data.

According to an exemplary embodiment, the setting may include setting the order of the update based on the preset priority and setting the order of the update to the two or more target controllers having the same priority, based on the size of the update data when the preset priority of each of two or more target controllers among the plurality of target controllers is the same.

According to an exemplary embodiment, the order of the update may be configured to first update a target controller, which has a smaller size of the update data, among the two or more target controllers.

According to an exemplary embodiment, the setting may include setting the order of the update of the two or more target controllers, based on the size of the update data for all of the two or more target controllers when two or more target controllers among the plurality of target controllers are related to each other.

According to an exemplary embodiment, two or more target controllers performing cooperative control with each other among the plurality of target controllers may be identified as the two or more target controllers that are related to each other.

According to an exemplary embodiment, the receiving may include simultaneously receive the update data for all of the two or more target controllers, from the server.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
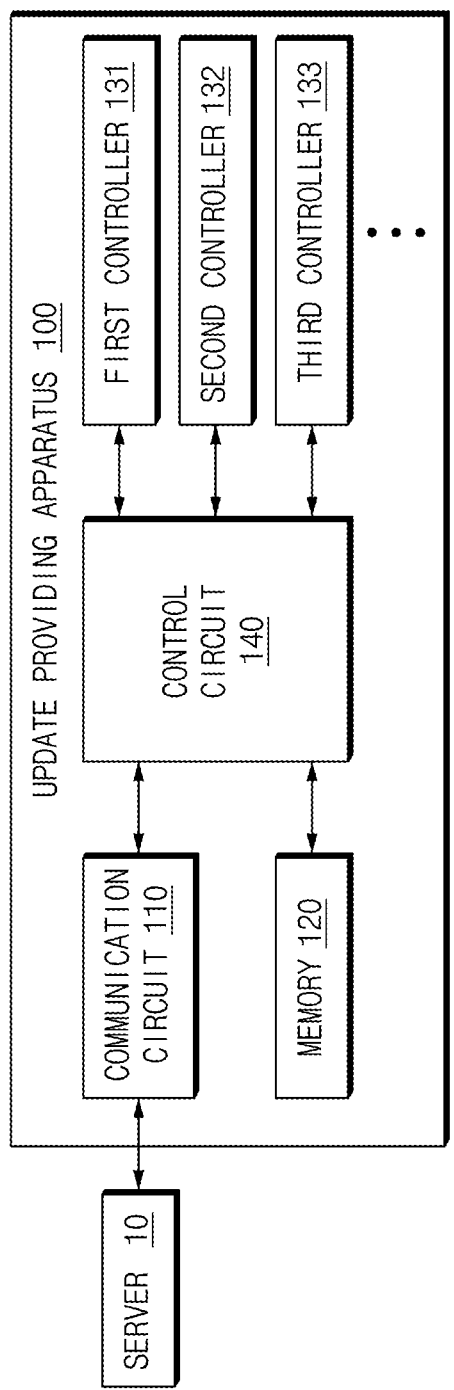
FIG. 1 is a block diagram illustrating a configuration of an apparatus of providing an update for a vehicle, according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

In describing elements of exemplary embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which this invention belongs. It will be understood that terms used herein should be interpreted as having a meaning that is consistent with their meaning in the context of the present disclosure and the relevant art and will not be interpreted in an idealized or overly formal sense unless expressly so defined herein.

FIG. 1 is a block diagram illustrating a configuration of an apparatus of providing an update for a vehicle, according to an exemplary embodiment of the present disclosure.

Referring to FIG. 1, an apparatus 100 of providing an update for a vehicle according to an exemplary embodiment may include a communication circuit 110, a memory 120, a plurality of controllers 131, 132, and 133, and a control circuit 140. The update providing apparatus 100 of FIG. 1 may be mounted in the vehicle.

The communication circuit 110 may be configured to communicate with a server 10. The communication circuit 110 may support wireless communication of various schemes and may receive data from the server 10. The communication circuit 110 according to an exemplary embodiment of the present disclosure may be a hardware device implemented with various electronic circuits to transmit and receive signals via wireless or landline connections.

The memory 120 may include a volatile and/or nonvolatile memory. The memory 120 may store data received from the server 10. For example, the memory 120 may store various pieces of data associated with the update.

The plurality of controllers 131, 132, and 133 may include the first controller 131, the second controller 132, and the third controller 133. Each of the plurality of controllers 131, 132, and 133 may control the configuration included in the vehicle. An embodiment is exemplified in FIG. 1 as the number of the plurality of controllers 131, 132, and 133 is three, but is not limited thereto. For example, controllers of the arbitrary number may be mounted in the vehicle.

The control circuit 140 may be electrically connected to the communication circuit 110, the memory 120, and the plurality of controllers 131, 132, and 133. The control circuit 140 may control the communication circuit 110, the memory 120, and the plurality of controllers 131, 132, and 133 and may perform various data processing and calculation. The control circuit 140 may be, for example, a communication control unit (CCU), an electronic control unit (ECU) or another sub-controller, which is mounted in the vehicle. The control circuit 140 according to an exemplary embodiment of the present disclosure may be a processor (e.g., computer, microprocessor, CPU, ASIC, circuitry, etc.). An embodiment is exemplified in FIG. 1 as the control circuit 140 is a single configuration, but is not limited thereto. For example, the control circuit 140 may be implemented to be divided into two or more portions.

According to an exemplary embodiment, the control circuit 140 may determine whether the update for a plurality of target controllers among the plurality of controllers 131, 132, and 133 is required. Because it is necessary to set the update order when a plurality of update target controllers are present, the control circuit 140 may determine whether the update for a plurality of target controllers is required. For example, the control circuit 140 may check the version information of the update data for each of the plurality of controllers 131, 132, and 133 stored in the server 10 and may determine a plurality of target controllers, which require the update, from among the plurality of controllers 131, 132, and 133 based on the version information of the update data. In the following description, it is assumed that the first controller 131, the second controller 132, and the third controller 133 are target controllers.

According to an exemplary embodiment, when the update for a plurality of target controllers among the plurality of controllers 131, 132, and 133 is required, the control circuit 140 may set the order of the update based on the preset priority and the size of update data, which correspond to each of a plurality of target controllers. The control circuit 140 may set the order associated with the download and installation of the update data for the purpose of efficiently using the safety and time of the update.

According to an exemplary embodiment, the control circuit 140 may set the order of the update based on the preset priority. For example, the priority may be recorded in a flag included in the update data. The update may be performed from the controller that urgently requires the update, by setting the order of update depending on the priority. For example, when the priority of the first controller 131 is "high" and the priorities of the second controller 132 and the third controller 133 are "low", the update for the first controller 131 may be performed first.

According to an exemplary embodiment, when the preset priorities of two or more target controllers among the plurality of target controllers are the same as one another, the control circuit 140 may set the order of update based on the size of update data with respect to two or more target controllers having the same priority. For example, the control circuit 140 may first update a target controller, which has a smaller size of update data, among two or more target controllers. More controllers may be updated within a limited time by first updating the target controller having the smaller size of update data when priorities are the same as one another. For example, when the priorities of the second controller 132 and the third controller 133 may be the same as each other, the size of the update data of the second controller 132 is 1 MB, and the size of the update data of the third controller 133 is 10 MB, the control circuit 140 may first perform the update for the second controller 132.

According to an exemplary embodiment, when two or more target controllers among a plurality of target controllers are related to each other, the control circuit 140 may set the update order of two or more target controllers based on the size of the update data for all of the two or more target controllers. For example, the control circuit 140 may identify target controllers, which perform cooperative control with each other, among a plurality of target controllers as the two or more target controllers that are related to each other. Because the cooperative control is not performed normally when only some target controllers of the two or more target controllers that perform cooperative control are first updated, the control circuit 140 may treat two or more target controllers that perform cooperative control as a single target controller, in determining the update order. For example, when the size of the update data of the first controller 131 is 2 MB, the size of the update data of the second controller 132 is 8 MB, the update data size of the third controller 133 is 9 MB, the first controller 131 and the second controller 132 perform cooperative control, the priorities of the three controllers 131, 132, and 133 are the same as each other, the control circuit 140 may first perform the update for the third controller 133 and then may perform the update for the first controller 131 and the second controller 132.

According to an exemplary embodiment, the control circuit 140 may receive update data corresponding to each of the plurality of target controllers, from the server 10 by using the communication circuit 110 in the set order. The control circuit 140 may sequentially download the update data in the set order. When two or more target controllers among the plurality of target controllers are related to each other, the control circuit 140 may simultaneously receive update data of all of the two or more target controllers, from the server 10 by using the communication circuit 110. The update is performed at the same time by merging the update data of the controllers that perform the cooperative control, thereby preventing only some controllers from being updated.

According to an exemplary embodiment, the control circuit 140 may update a plurality of target controllers in the set order, using the received update data. The control circuit 140 may transmit the update data to each of the plurality of target controllers in the set order. The plurality of target controllers may be updated by the transmitted data.

Figure 2:
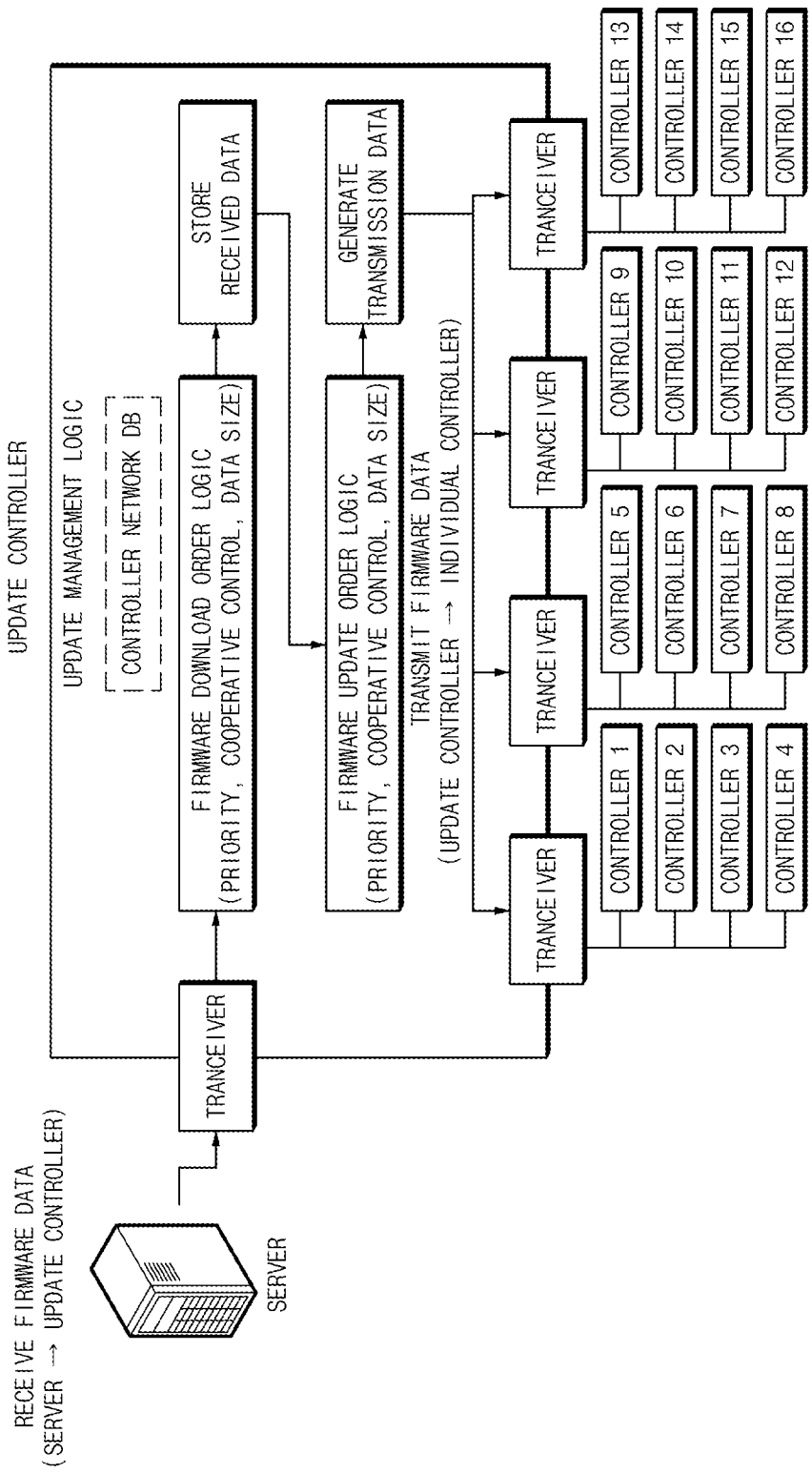
FIG. 2 is a block diagram for describing an exemplary operation of an apparatus of providing an update for a vehicle, according to an exemplary embodiment of the present disclosure.

FIG. 2 is a block diagram for describing an exemplary operation of an apparatus of providing an update for a vehicle, according to an exemplary embodiment of the present disclosure.

Referring to FIG. 2, an update controller according to an exemplary embodiment may include update management logic, and the update management logic may include firmware download order logic and firmware update order logic. The update controller may determine the download order and update order of the firmware (e.g., update data) for the stability of the update and the optimization of the required time, upon updating the vehicle controller.

The update management logic may receive the updated firmware from a server via a transceiver. The firmware download order logic may set the order, based on the priority, the size of data, whether cooperative control is performed, and the like. The order may be set depending on the method described with reference to FIG. 1. The update management logic may sequentially download the firmware in the set order. The downloaded firmware may be stored.

The update management logic may transmit the stored firmware to the update target controller via the transceiver. The firmware update order logic may set the order, based on the priority, the size of data, whether cooperative control is performed, and the like. The update order may be the same as the download order. The update management logic may sequentially generate the transmission data in the set order and may transmit the transmission data to the update target controller. The update target controller may be updated by the transmitted data.

The update management logic may classify controllers that perform cooperative control, based on the controller network database and may set the order depending on whether cooperative control is performed.

Figure 3:
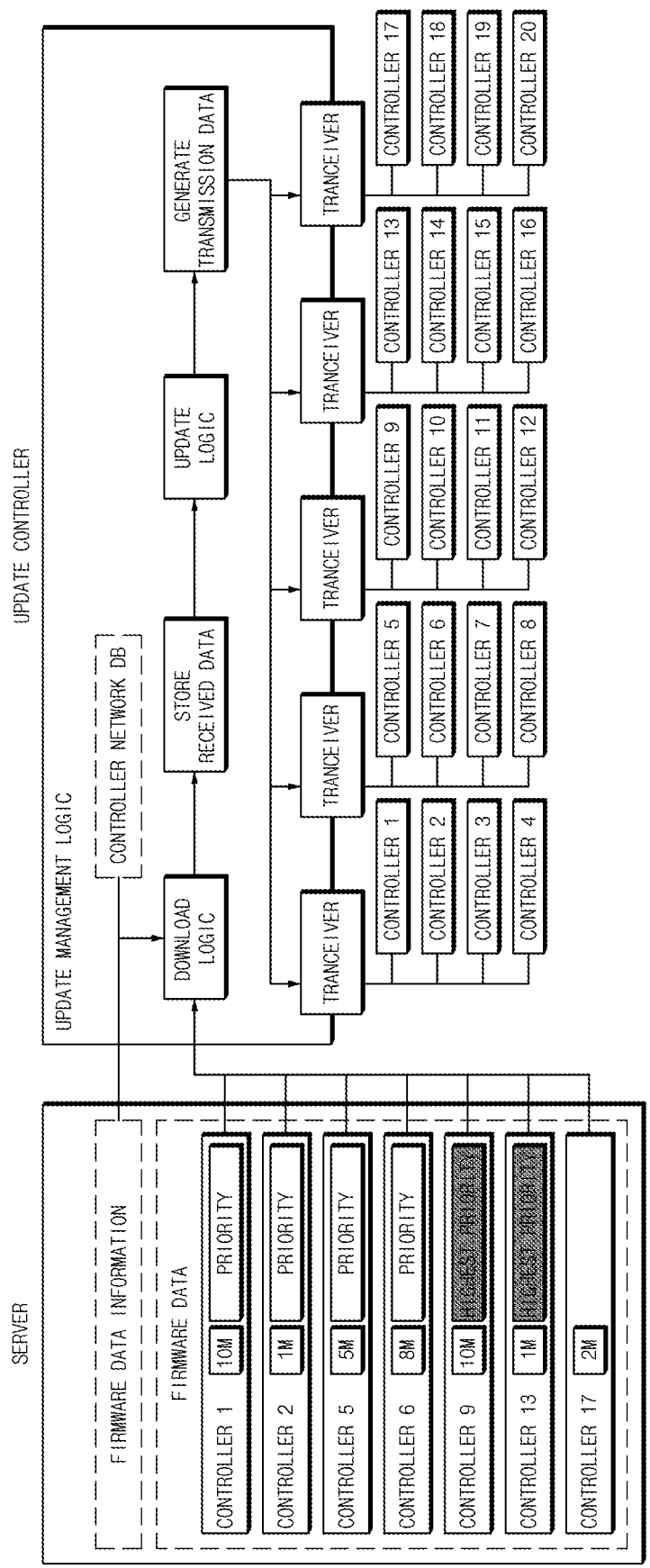
FIG. 3 is a block diagram for describing an exemplary operation of an update providing apparatus of providing an update for a vehicle, according to an exemplary embodiment of the present disclosure.

FIG. 3 is a block diagram for describing an exemplary operation of an apparatus of providing an update for a vehicle, according to an exemplary embodiment of the present disclosure.

Referring to FIG. 3, an update controller according to an exemplary embodiment may include update management logic, and the update management logic may set the update order, based on information received from a server.

The update management logic may receive firmware data information from the server. The firmware data information may be stored in a controller network database and may be used to set an update order. The firmware data information may include information about the size and priority of firmware. When target controllers are controllers 1, 2, 5, 6, 9, 13, and 17, the update management logic may receive firmware data information about all of the target controllers. The priority may be determined in order of a controller of which the flag is "highest priority", a controller of which the flag is "priority", and a controller in which there is no flag.

For example, when the target controllers are the controller 1, 2, 5, 6, 9, 13, and 17, the update order may be set in order of the controller 13, the controller 9, the controller 2, the controller 5, the controller 6, the controller 1, and the controller 17. For another example, when the controller 5 and the controller 6 perform cooperative control, the update order may be set in order of the controller 13, the controller 9, the controller 2, the controller 1, the controller 5 and the controller 6, and the controller 17. The update management logic may download the firmware in the set update order and may transmit the firmware to each of the target controllers.

Figure 4:
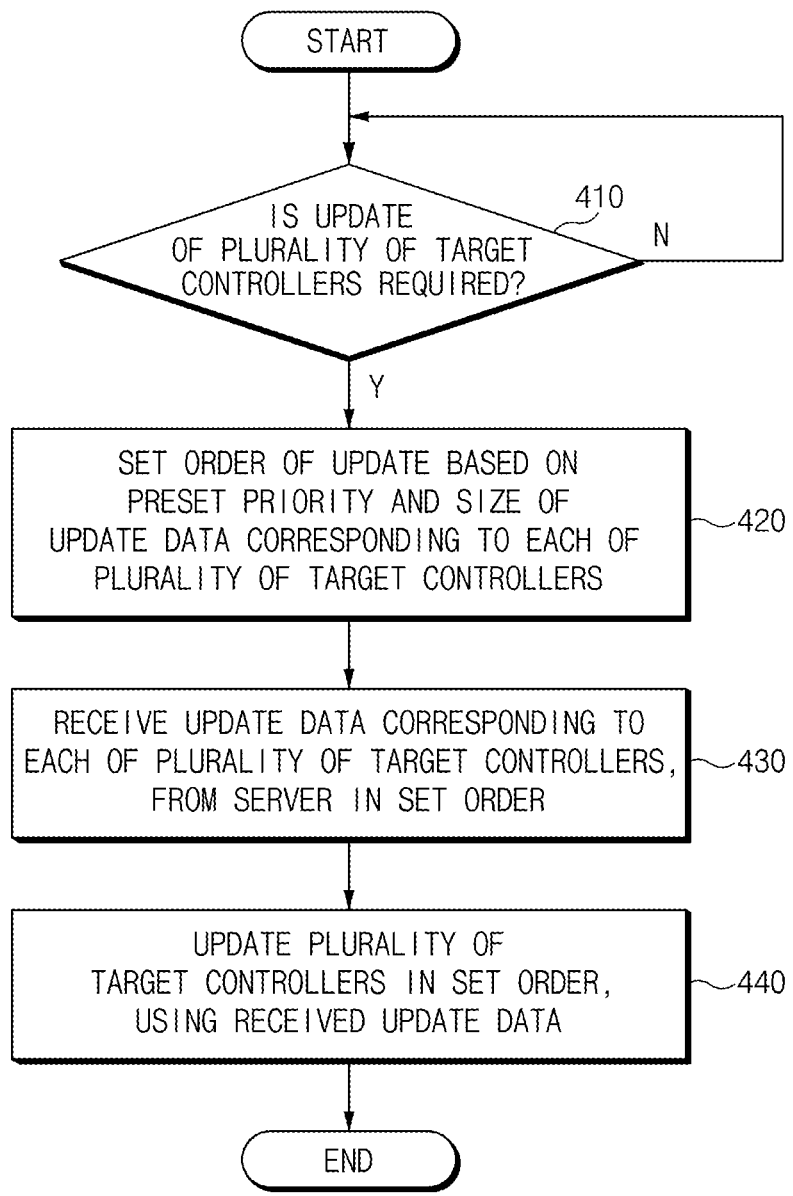
FIG. 4 is a flowchart for describing an update providing method of a vehicle, according to various exemplary embodiments of the present disclosure.

FIG. 4 is a flowchart for describing an update providing method of a vehicle, according to various exemplary embodiments of the present disclosure.

Hereinafter, it is assumed that the update providing apparatus 100 of FIG. 1 performs the process of FIG. 4. In addition, in a description of FIG. 4, it may be understood that an operation described as being performed by a vehicle is controlled by the control circuit 140 or a sub-controller of the update providing apparatus 100.

Referring to FIG. 4, in operation 410, a vehicle may determine whether the update for a plurality of target controllers is required. For example, the vehicle may identify the target controller to which firmware of the new version is uploaded by the server, and may determine whether there are a plurality of identified target controllers.

In operation 420, the vehicle may set the order of update based on the size of update data and the preset priority corresponding to each of a plurality of target controllers. For example, the vehicle may set the order of the update depending on the priority information included in the firmware; when the priorities are the same as one another, the vehicle may set the order of update depending on the size of firmware. The vehicle may identically set the update order of the controllers performing the cooperative control.

In operation 430, the vehicle may receive the update data corresponding to each of the plurality of target controllers, from the server in the set order. For example, the vehicle may sequentially receive the update data in the set order.

In operation 440, the vehicle may update the plurality of target controllers in the set order, using the received update data. For example, the vehicle may sequentially transmit the update data to the plurality of target controllers in the set order.

Figure 5:
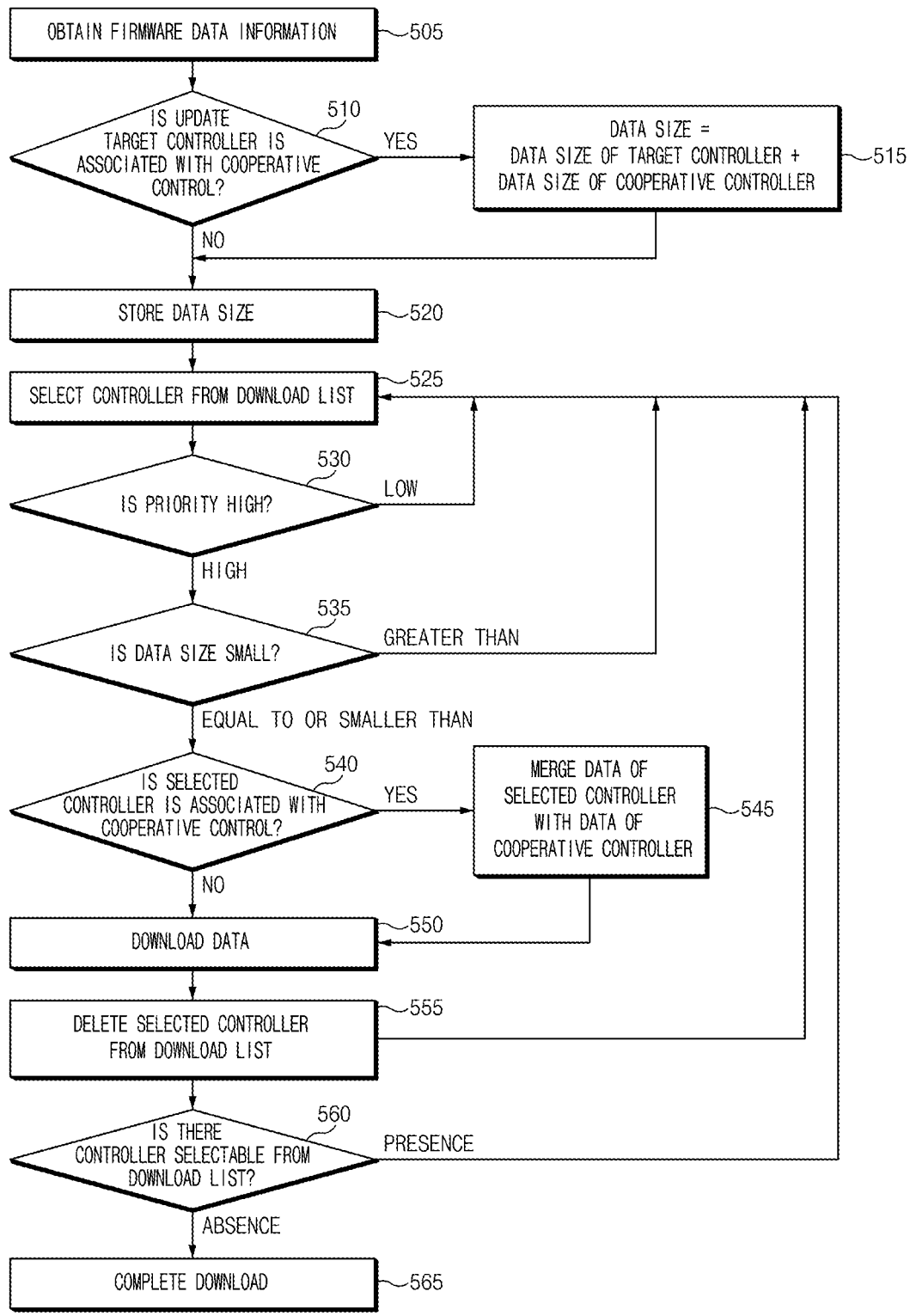
FIG. 5 is a flowchart for describing an update providing method of a vehicle, according to various exemplary embodiments of the present disclosure.

FIG. 5 is a flowchart for describing an update providing method of a vehicle, according to various exemplary embodiments of the present disclosure.

Hereinafter, it is assumed that the update providing apparatus 100 of FIG. 1 performs the process of FIG. 5. In addition, in a description of FIG. 5, it may be understood that an operation described as being performed by a vehicle is controlled by the control circuit 140 or a sub-controller of the update providing apparatus 100.

Referring to FIG. 5, in operation 505, the vehicle may obtain firmware data information from a server. In operation 510, the vehicle may determine whether an update target controller is associated with cooperative control. When the update target controller is associated with the cooperative control, in operation 515, the vehicle may determine the data size by summing the size of the update data of each of the controllers associated with the cooperative control. When the update target controller is not associated with the cooperative control, the summation is not required. In operation 520, the vehicle may store the data size.

In operation 525, the vehicle may select a controller from the download list. The vehicle may select the controller with the highest update order, from the download list through operations 530 and operations 535. In operation 530, the vehicle may determine whether the priority of the selected controller is highest in the download list. When the priority is high, in operation 535, the vehicle may determine whether the data size of the selected controller among the controllers having the same priority is the smallest. When the priority is low, the vehicle may select another controller from the download list. When the data size of the selected controller is smaller than or equal to the data size of another controller, in operation 540, the vehicle may determine whether the selected controller is associated with cooperative control. When the data size is greater than the data size of another controller, the vehicle may select another controller from the download list. When the update target controller is associated with the cooperative control, in operation 545, the vehicle may merge the data of the selected controller with data of another controller performing cooperative control. When the update target controller is not associated with the cooperative control, the mergence is not required. In operation 550, the vehicle may download the data of the selected controller.

In operation 555, the vehicle may delete the selected controller from the download list. In operation 560, the vehicle may determine whether there is a controller selectable from the download list. When the selectable controller is present, the vehicle may repeat operation 525 to operation 555. If there is no selectable controller in the list, in operation 565, the vehicle may complete the download.

Figure 6:
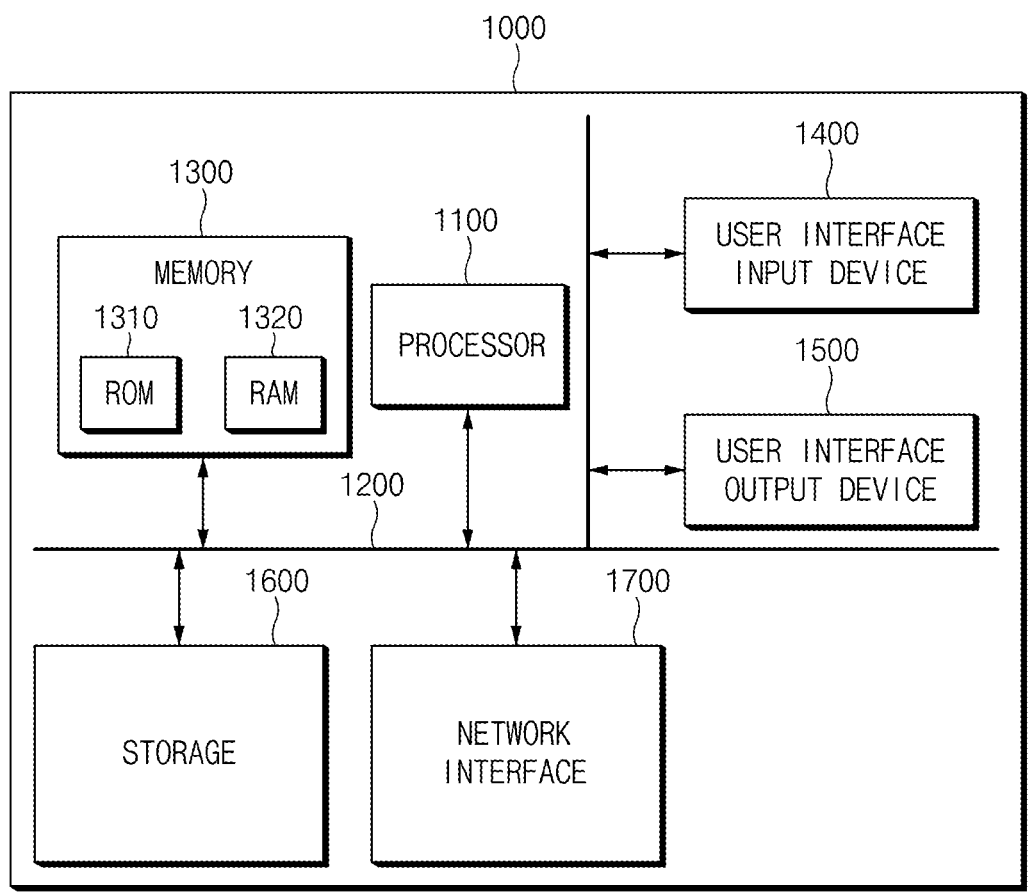
FIG. 6 illustrates a computing system according to an exemplary embodiment of the present disclosure.

FIG. 6 illustrates a computing system according to an exemplary embodiment of the present disclosure.

Referring to FIG. 6, an apparatus according to an exemplary embodiment of the present disclosure may be implemented through a computing system. A computing system 1000 may include at least one processor 1100, a memory 1300, a user interface input device 1400, a user interface output device 1500, storage 1600, and a network interface 1700, which are connected with each other through a system bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) and a random access memory (RAM).

Accordingly, the operations of the method or algorithm described in connection with the exemplary embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may be implemented with separate components in the user terminal.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, exemplary embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

According to an exemplary embodiment of the present disclosure, an apparatus and a method for providing update for a vehicle may set the order of update in consideration of the preset priority and the size of update data, thereby improving the efficiency of the update performed by the vehicle over the wireless communication.

Besides, a variety of effects directly or indirectly understood through this disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus of providing an update for a vehicle, the apparatus comprising:
    a plurality of controllers;
    a communication circuit configured to communicate with a server;
    a memory configured to store data received from the server; and
    a control circuit electrically connected to the plurality of controllers, the communication circuit, and the memory,
    wherein the control circuit is configured to:
    when an update for a plurality of target controllers among the plurality of controllers is required, set an order of the update based on a preset priority, a size of update data, and cooperative control, which correspond to each of the plurality of target controllers,
    receive the update data corresponding to each of the plurality of target controllers, from the server using the communication circuit in the set order, and
    update the plurality of target controllers in the set order using the received update data,
    wherein the control circuit is further configured to:
    when two or more target controllers among the plurality of target controllers are related to each other, set the order of the update for the two or more target controllers, based on the size of the update data corresponding to all of the two or more target controllers.

2. The apparatus of claim 1, wherein the control circuit is further configured to:
    check version information of the update data corresponding to each of the plurality of controllers, which is stored in the server, and
    determine the plurality of target controllers, which require the update, among the plurality of controllers based on the version information of the update data.

3. The apparatus of claim 1, wherein the control circuit is further configured to:
    set the order of the update based on the preset priority, and
    when two or more target controllers among the plurality of target controllers have a same preset priority, set the order of the update for the two or more target controllers having the same preset priority based on the size of the update data.

4. The apparatus of claim 3, wherein the control circuit is further configured to: update first a target controller, which has a smaller size of the update data among the two or more target controllers.

5. The apparatus of claim 1, wherein the control circuit is further configured to:
    identify two or more target controllers, which perform cooperative control with each other, among the plurality of target controllers as the two or more target controllers that are related to each other.

6. The apparatus of claim 1, wherein the control circuit is further configured to:
    simultaneously receive the update data corresponding to all of the two or more target controllers, from the server using the communication circuit.

7. A method of providing an update for a vehicle, the method comprising steps of:
    when an update for a plurality of target controllers among a plurality of controllers included in the vehicle is required, setting an order of the update based on a preset priority, a size of update data, and cooperative control which correspond to each of the plurality of target controllers;
    receiving the update data corresponding to each of the plurality of target controllers, from a server in the set order; and
    updating the plurality of target controllers in the set order using the received update data,
    wherein the step of setting includes:
    when two or more target controllers among the plurality of target controllers are related to each other, setting the order of the update for the two or more target controllers, based on the size of the update data corresponding to all of the two or more target controllers.

8. The method of claim 7, further comprising steps of:
    checking version information of the update data corresponding to each of the plurality of controllers, which is stored in the server; and
    determining the plurality of target controllers, which require the update, among the plurality of controllers based on the version information of the update data.

9. The method of claim 7, wherein the step of setting includes:
    setting the order of the update based on the preset priority; and
    when two or more target controllers among the plurality of target controllers have a same preset priority, setting the order of the update for the two or more target controllers having the same preset priority, based on the size of the update data.

10. The method of claim 9, wherein the order of the update is configured to update first a target controller, which has a smaller size of the update data among the two or more target controllers.

11. The method of claim 7, wherein two or more target controllers performing cooperative control with each other among the plurality of target controllers are identified as the two or more target controllers that are related to each other.

12. The method of claim 7, wherein the step of receiving includes:
    simultaneously receiving the update data corresponding to all of the two or more target controllers, from the server.

* * * * *